(12) United States Patent
Russell

(10) Patent No.: US 8,328,504 B2
(45) Date of Patent: Dec. 11, 2012

(54) AEROENGINE DRAIN ASSEMBLY

(75) Inventor: Michael Edwin Russell, Derby (GB)

(73) Assignee: Rolls-Royce PLC (GB)

( * ) Notice: Subject to any disclaimer, the term of this patent is extended or adjusted under 35 U.S.C. 154(b) by 1374 days.

(21) Appl. No.: 11/970,639

(22) Filed: Jan. 8, 2008

(65) Prior Publication Data
US 2008/0181770 A1  Jul. 31, 2008

(30) Foreign Application Priority Data
Jan. 30, 2007 (GB) .................................. 0701683.5

(51) Int. Cl.
*F01D 25/24* (2006.01)
*F01D 25/32* (2006.01)
(52) U.S. Cl. ...................... 415/168.1; 415/111; 415/112; 60/39.091; 60/39.094; 244/129.1; 244/136
(58) Field of Classification Search .......... 415/110–112, 415/168.1, 168.2, 168.4; 60/39.091, 39.094, 60/796, 798, 801; 137/884; 244/129.1, 136, 244/53 R; 239/171; 220/366.1, 367.1, 368, 571; 73/49.1, 49.2, 40.5 R
See application file for complete search history.

(56) References Cited

U.S. PATENT DOCUMENTS

| | | | |
|---|---|---|---|
| 5,104,069 A | 4/1992 | Reising | |
| 5,285,636 A | 2/1994 | Mayo et al. | |
| 6,571,562 B2 * | 6/2003 | Wilcox | 60/39.094 |
| 6,578,361 B1 | 6/2003 | Higginbotham et al. | |

* cited by examiner

Primary Examiner — Christopher Verdier
(74) Attorney, Agent, or Firm — McCormick, Paulding & Huber LLP

(57) ABSTRACT

A gas turbine engine has a nacelle, a plurality of pipes and a drains assembly, the drains assembly including a drains mast that extends through the nacelle and provides an outlet for the pipes. The engine is characterised in that drains assembly has a connection block defining internal passages and is arranged to connect between the pipes and the drains mast. The connection block also has lateral connections to the pipes enabling the nacelle to have a lower profile; thereby reducing aerodynamic drag.

9 Claims, 3 Drawing Sheets

US 8,328,504 B2

AEROENGINE DRAIN ASSEMBLY

CROSS-REFERENCE TO RELATED APPLICATION

This application is entitled to the benefit of British Patent Application No. GB 0701683.5 filed on Jan. 30, 2007.

FIELD OF THE INVENTION

The present invention relates to a drain assembly for discharging fluids from pipes and conduits of a gas turbine engine.

BACKGROUND OF THE INVENTION

A gas turbine engine requires a drain assembly to collect excess or spilled fluids from various service pipes and to discharge the fluids safely overboard. The drain assembly comprises a drains mast that extends through a nacelle surrounding the engine. Identification markings are placed on the mast to indicate particular fluid spill and therefore assist engine fault diagnosis.

Drain assemblies must be positioned at or near to the bottom dead centre of the engine to allow the spilled fluids to exit the drains mast via gravity. Conventional engine drain assemblies, as shown in FIG. 3, comprise a mounting bracket off which the mast extends, the pipes are routed through the hollow mast. Although a working design, this conventional arrangement means that the distance between the engine and the external surface of the nacelle is particularly large and the powerplant is therefore disadvantaged by aerodynamic losses and weight.

SUMMARY OF THE INVENTION

Therefore, it is an object of the present invention to provide a more compact drains assembly and therefore a more aerodynamic and lighter nacelle.

In accordance with the present invention, a gas turbine engine comprises a nacelle, a plurality of pipes and a drains assembly, the drains assembly includes a drains mast that extends through the nacelle and provides an outlet for the pipes characterised in that drains assembly comprises a connection block defining internal passages and is arranged to connect between the pipes and the drains mast.

Preferably, the connection block includes an elastomeric material.

Preferably, a mounting bracket is arranged to mount the connection block to the engine.

Preferably, the connection block includes lateral connections to the pipes.

Preferably, a portion of the pipes at the connection is at an angle that is greater than the mounting angle of the engine.

Preferably, the angle is up to 5 degrees greater than the mounting angle of the engine.

Preferably, the connection block includes a lateral surface that is at an angled greater than the mounting angle of the engine.

Alternatively, the connection block includes a lateral surface that has two or more regions that are angled greater than the mounting angle of the engine.

Conveniently, the drains mast includes internal tubes defining outlets, the internal tubes are connected to the passages of the connection block.

DETAILED DESCRIPTION OF THE PREFERRED EMBODIMENTS

Figure 1:
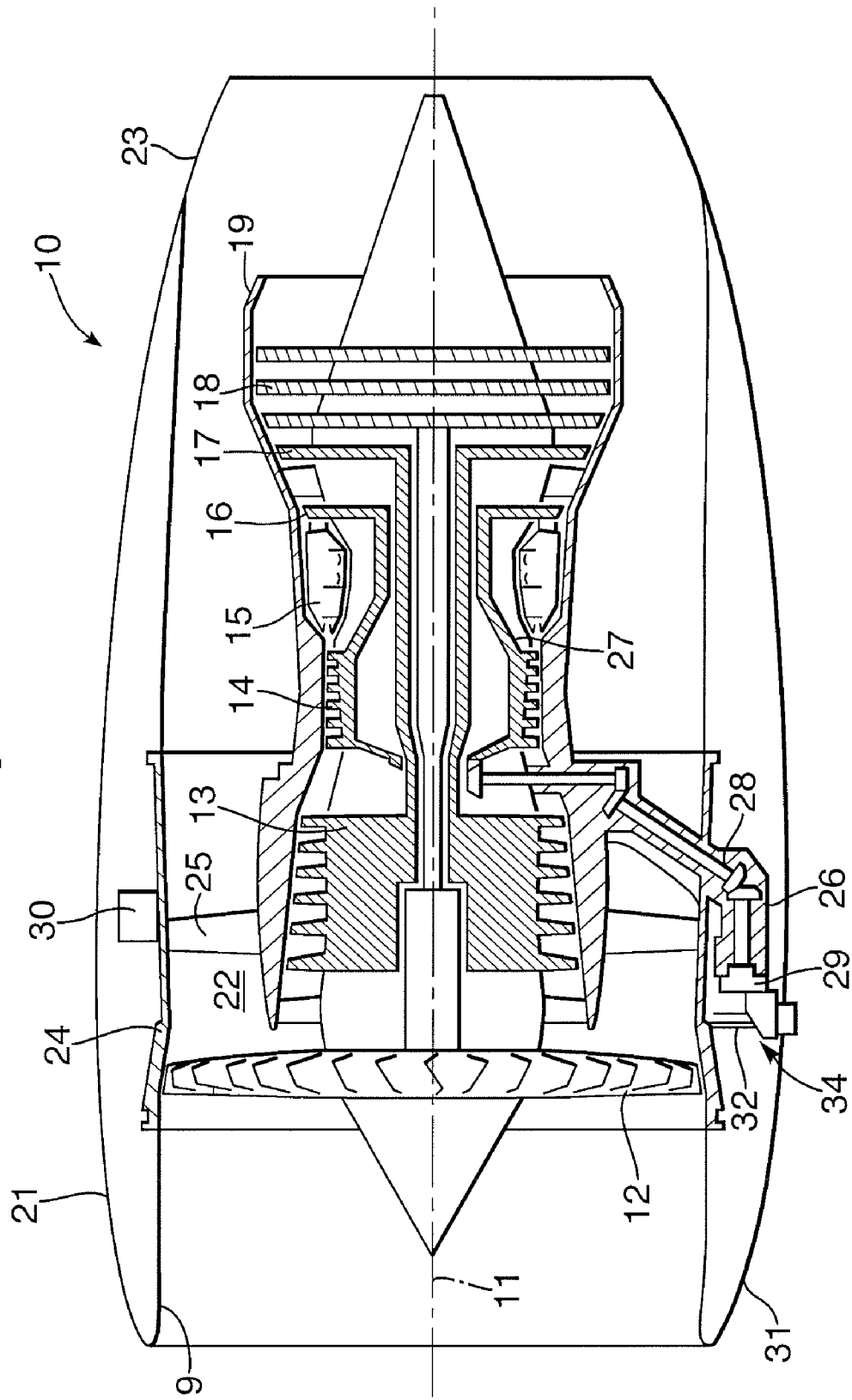
FIG. 1 is a schematic section of part of a ducted fan gas turbine engine.

Referring to FIG. 1, a ducted fan gas turbine engine generally indicated at 10 has a principal and rotational axis 11. The engine 10 comprises, in axial flow series, an air intake 9, a propulsive fan 12, an intermediate pressure compressor 13, a high-pressure compressor 14, combustion equipment 15, a high-pressure turbine 16, and intermediate pressure turbine 17, a low-pressure turbine 18 and a core exhaust nozzle 19. A nacelle 21 generally surrounds the engine 10 and defines the intake 9, a bypass duct 22 and an exhaust nozzle 23.

The gas turbine engine 10 works in the conventional manner so that air entering the intake 9 is accelerated by the fan 12 to produce two air flows: a first airflow into the intermediate pressure compressor 13 and a second airflow which passes through a bypass duct 22 to provide propulsive thrust. The intermediate pressure compressor 13 compresses the airflow directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines 16, 17, 18 respectively drive the high and intermediate pressure compressors 14, 13 and the fan 12 by suitable interconnecting shafts 27.

The fan 12 is circumferentially surrounded by a structural member in the form of a fan casing 24, which is supported by an annular array of outlet guide vanes 25.

A gear box 26 and drive 28 connect the high-pressure shaft 27 to a starter/generator 29. The gear box 26 and other accessories are mounted on the fan casing 24. Overflow or spillage pipes 32 connect between the engine accessories, and to other engine components such as bearings, to a drain assembly 34. The drain assembly 34 is mounted to the gearbox, but could be mounted elsewhere, and extends through the nacelle 21 and provides an outlet for the pipes 32 where the spilled fluids are discharged.

Figure 2:
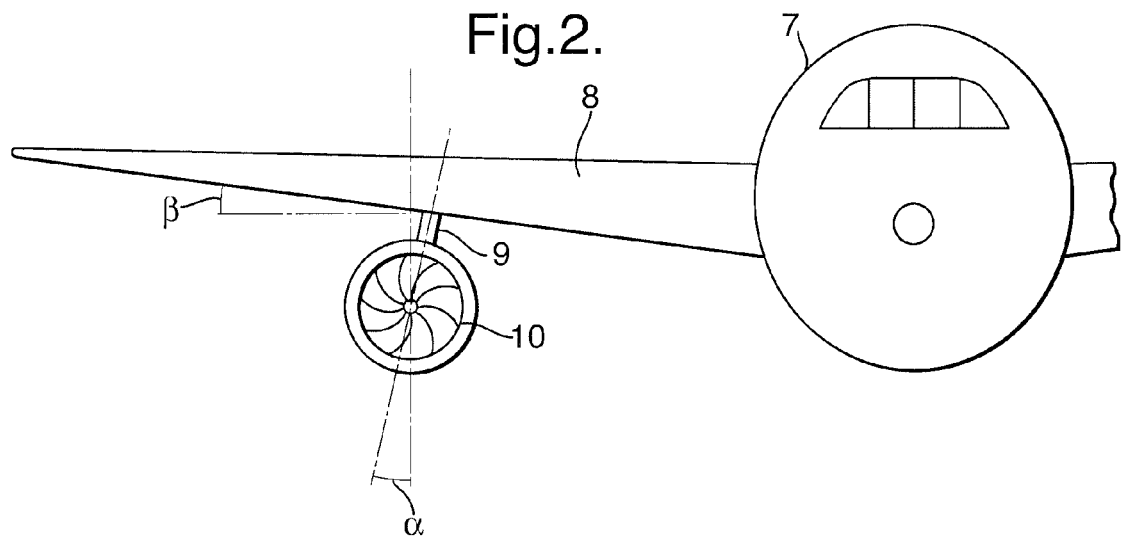
FIG. 2 is a front view of an aircraft showing a wing mounted engine.

Referring to FIG. 2, the engine 10 is mounted to a wing 8 of an aircraft 7 via a pylon 9. The wing 8 is arranged at a dihedral angle β to the horizontal. The dihedral angle β is usually between 4-8 degrees and is typically 6 degrees. The pylon 9 is usually normal to the wing's under-surface and the engine 10 is therefore mounted at an angle α, which is usually the same value as the dihedral angle. However, it should be appreciated that angle α may not necessarily be the same as the dihedral angle β.

Figure 3:
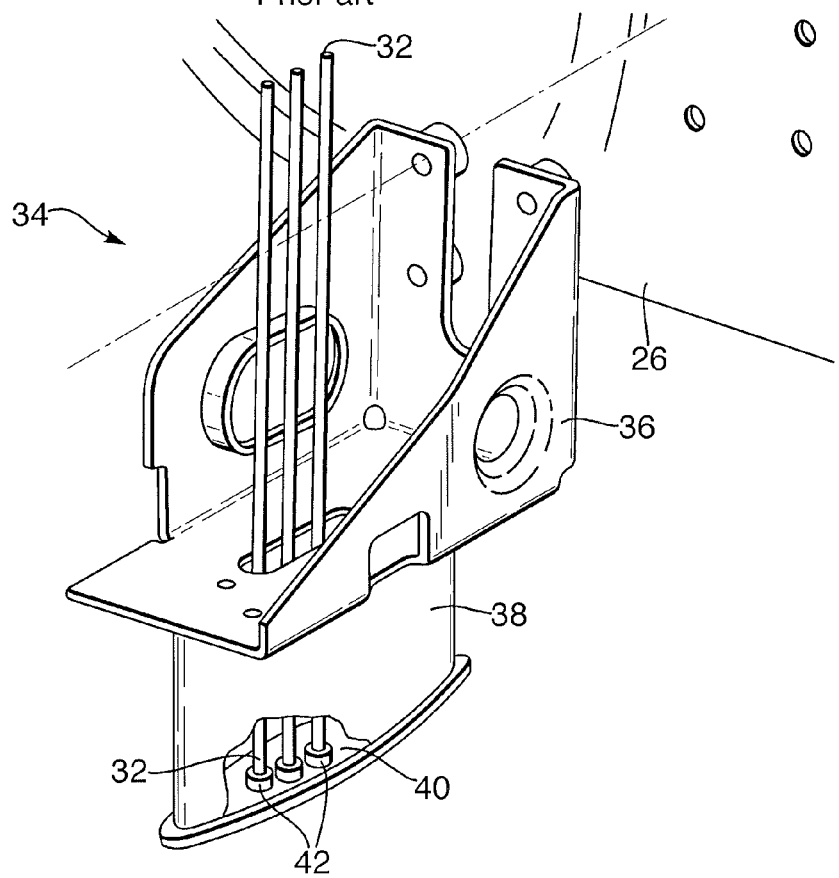
FIG. 3 is a view of a prior art drain assembly.

FIG. 3 shows a prior art drain assembly 34 comprising a bracket 36, attached to the gearbox 26, and a drains mast 38. The drains mast 38 is an aerodynamically shaped hollow body having a flat end 40 defining outlets 42 for the pipes 32. In all cases the pipes 32 enter the drain assembly 34 and the mast 38 from vertically above. However, this arrangement is disadvantaged because the pipes 32 require complex bends and a large gap is required between the outer surface 31 of the nacelle 21 and the engine 10 to accommodate the drain assembly 34. Thus the prior art drains assembly 34 compromises the aerodynamic profile of the nacelle 21.

Figure 4:
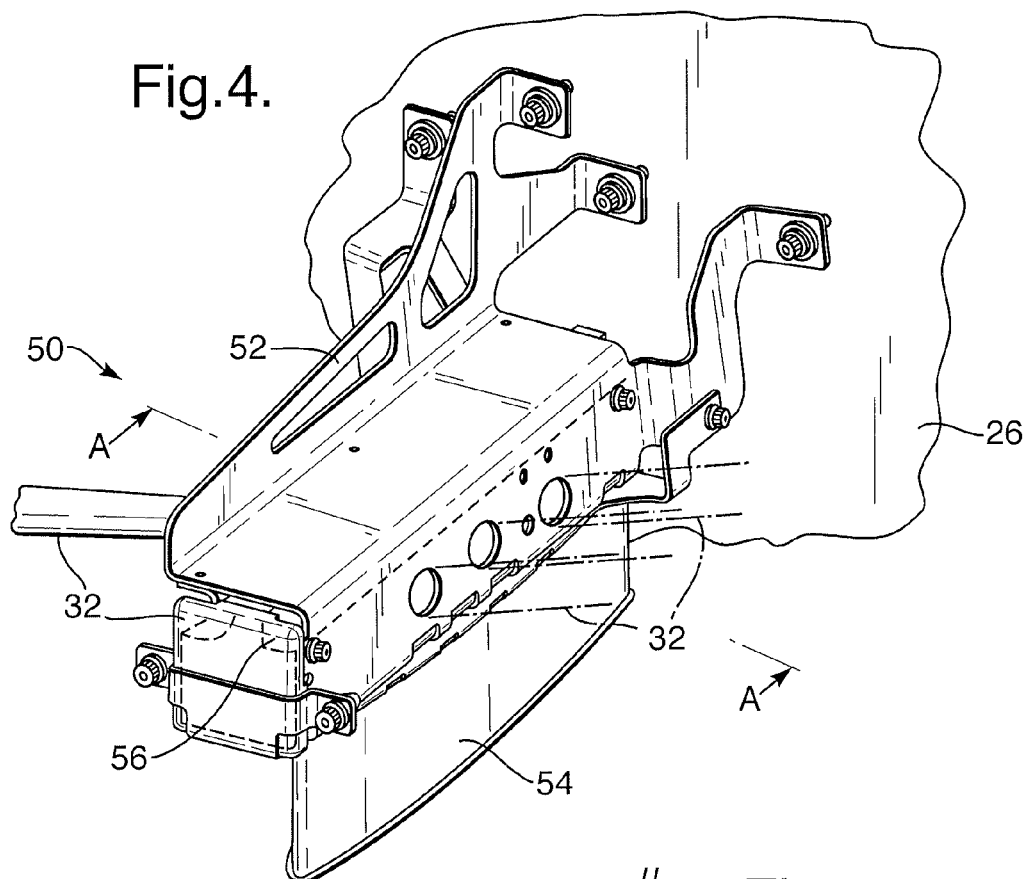
FIG. 4 is a view on a drain assembly in accordance with the present invention.
Figure 5:
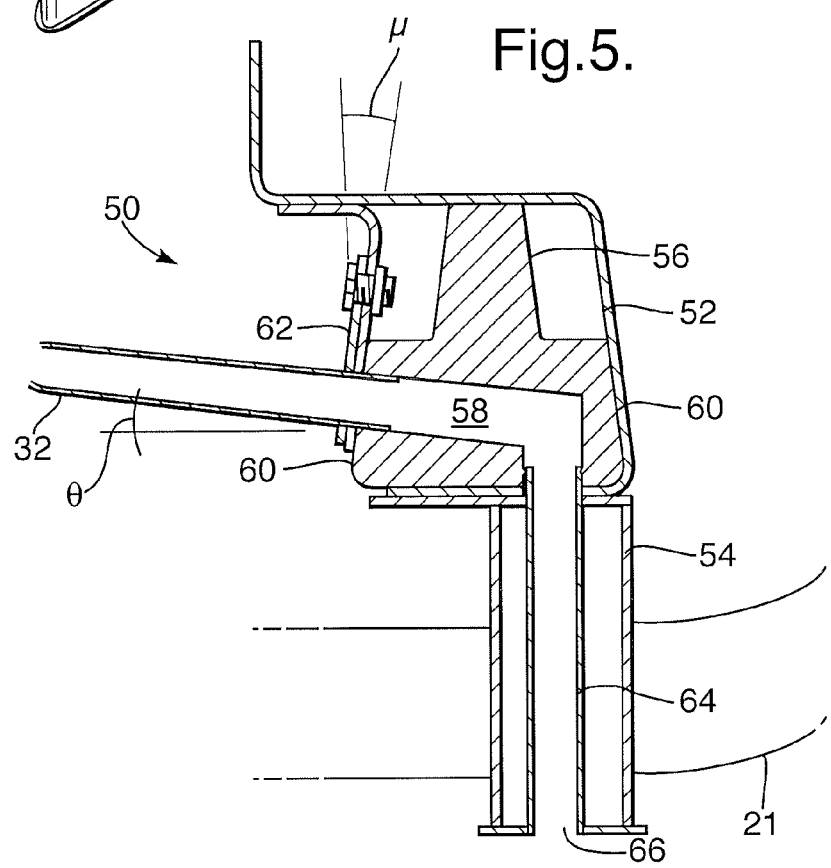
FIG. 5 is a cross-section A-A shown in FIG. 4.

FIGS. 4 and 5 show a drains assembly 50 in accordance with the present invention. The drains assembly comprises a mounting bracket 52 and a connection block 56 for connecting between the plurality of pipes 32 and a drain mast 54. The drain mast 54 has the same aerodynamic profile as the prior art mast 38 and similarly extends through the nacelle 21. The drains mast 54 comprises a plurality of internal tubes 64 extending from an outlet 66 of the mast to the connection block 56.

The connection block 56 is a solid body defining internal passages 58 therethrough (only one of which is shown) and is arranged to connect between the pipes 32 and the drains mast 54. The pipes 32 connect to the lateral sides 60 of the block 56 via interference fit between the end of the pipe 32 and the passageway 58. The pipes 32 are further secured in place via a collar 62 that is bolted to the mounting bracket 52. Similarly, the plurality of internal tubes 64 are connected to the connection block 56 via interference fits, with the tubes 64 extending into the connection block 56.

In a preferred embodiment, the connection block 56 comprises an elastomeric material such as rubber, but other materials that are resilient may be used.

Preferably, and as seen in FIG. 4, the pipes 32 connect to the block 56 perpendicularly to the lateral surface 60. So that the pipes 32 are always slightly sloping downward towards the block 56, the angle $\theta$ of the pipes 32 is required to be greater than the mounting angle $\alpha$ of the engine 10. Note here that normally there are pipes 32 attached to each side of the connection block 56 and that engines on opposite wings will be angled $\beta$ at +/−6 degrees. Thus the lateral surfaces 60 of the connection block 56 are angled $\mu$ at 7 degrees.

It should be appreciated that the angle $\theta$ of the pipes 32 may be less than or greater than stated above and is dependant on the engine's mounting angle $\alpha$ and/or the dihedral angle $\beta$ of the wing 8. Pipe angles $\theta$ up to 5 degrees greater than the mounting or dihedral angle $\alpha$, $\beta$ of the engine 10 are preferable. Pipe angles $\theta$ significantly greater than 5 degrees are still beneficial, but the benefit of a more compact and aerodynamic nacelle 21 profile is reduced because the connection block 56 will need to be positioned lower on the gearbox 26.

Note that only a portion of the pipes 32 near the connection block 56 are required to be at an angle $\theta$ that is greater than the mounting angle or dihedral angle $\alpha$, $\beta$ of the engine 10.

In the preferable embodiment where the pipes 32 connect to the block 56 perpendicular to the lateral surface 60, the lateral surface 60 is therefore arranged at a corresponding angle $\mu$, i.e., $\mu$ equals $\theta$. It is possible for the lateral sides 60 to be parallel i.e. $\mu$ does not equal $\theta$, for example, however, this will lead to uneven immersion of the pipe into the connection block and the possibility of the pipe forming a sump on one of the engines due to the dihedral.

In another embodiment, the connection block 56 comprises a lateral surface 60 having two or more regions that are angled $\mu$ differently to one another to accommodate different pipe angles $\theta$. In this case it may be that the various pipes 32 are routed around different engine architecture therefore having different clearances.

What is claimed is:

1. A gas turbine engine comprising:
 a nacelle;
 a plurality of pipes; and
 a drains assembly having
  a drains mast that extends through the nacelle and provides an outlet for the pipes, and that includes a plurality of internal tubes defining outlets for the plurality of pipes; and
  a connection block having a solid body and defining internal passages therethrough, said internal passages arranged to connect between the pipes and the internal tubes of the drains mast.

2. A gas turbine engine as claimed in claim 1 wherein the connection block further comprises an elastomeric material.

3. A gas turbine engine as claimed in claim 1 further comprising a mounting bracket arranged to mount the connection block to the engine.

4. A gas turbine engine as claimed in claim 1 wherein the connection block further comprises lateral connections to the pipes.

5. A gas turbine engine as claimed in claim 4 wherein a portion of the pipes at the connection is at an angle that is greater than the mounting angle of the engine.

6. A gas turbine engine as claimed in claim 5 wherein the angle is up to 5 degrees greater than the mounting angle of the engine.

7. A gas turbine engine as claimed in claim 1 wherein the connection block comprises a lateral surface that is at an angle greater than the mounting angle of the engine.

8. A gas turbine engine as claimed in claim 1 wherein the connection block comprises a lateral surface that has two or more regions that are angled greater than the mounting angle of the engine.

9. A gas turbine engine as claimed in claim 1 wherein the pipes and the internal tubes connect to the connection block via interference fits.

* * * * *